United States Patent [19]

Schaible et al.

[11] Patent Number: 4,711,078

[45] Date of Patent: Dec. 8, 1987

[54] BALER AND PROCESS FOR MAKING BALES OR FOR OPERATING THE BALER

[75] Inventors: Siegfried Schaible, Singen/Htwl; Heinz Hohlwegler, Gottmadingen; Bernhard Kohl, Winkelhaid, all of Fed. Rep. of Germany

[73] Assignee: Klockner-Humboldt-Deutz AG, Gottmadingen, Fed. Rep. of Germany

[21] Appl. No.: 783,876

[22] Filed: Oct. 3, 1985

[30] Foreign Application Priority Data

Oct. 8, 1984 [DE] Fed. Rep. of Germany ....... 3436883

[51] Int. Cl.$^4$ ............................................. A01D 39/00
[52] U.S. Cl. ........................................ 56/341; 56/10.2; 100/4
[58] Field of Search ........ 56/341, 343, 10.2, DIG. 15; 100/4, 3, 99, 177, 180, 184, 187

[56] References Cited

U.S. PATENT DOCUMENTS

| | | |
|---|---|---|
| 3,911,519 | 10/1975 | Aulas et al. ............................. 56/341 |
| 4,091,603 | 5/1978 | Oosterling et al. .............. 100/188 R |
| 4,172,414 | 10/1979 | Klinner et al. ......................... 56/341 |
| 4,184,312 | 1/1980 | Oosterling et al. .................... 56/341 |
| 4,240,245 | 12/1980 | Oosterling et al. .................... 56/341 |
| 4,413,553 | 11/1983 | Crawford .............................. 56/343 |

FOREIGN PATENT DOCUMENTS

| | | | |
|---|---|---|---|
| 74533 | 3/1983 | European Pat. Off. .............. 56/344 |
| 2740339 | 3/1979 | Fed. Rep. of Germany . | |
| 3208645 | 9/1983 | Fed. Rep. of Germany . | |

*Primary Examiner*—Gene Mancene
*Assistant Examiner*—John Weiss
*Attorney, Agent, or Firm*—Karl F. Ross; Herbert Dubno; Ronald Lianides

[57] ABSTRACT

The baler for crop material comprises an intake mechanism, a feed mechanism for transporting the crop material from the intake mechanism to a chamber for pressing and binding. Between the feed mechanism and the chamber for pressing and binding a bale separator is provided for the continuously supply of crop material attached to the housing of the baler outside of the feed path, which cuts away a bale by operation of a bale separator hydraulic cylinder and a slider hydraulic cylinder, after which the bale is bound, while additional crop materials are continuously fed into the baler. The process of our invention for making bales in a baler comprises continuously feeding crop material into the baler, which a bale cut away from those supplying crop material is separated therefrom, bound by cord, and ejected from the baler.

16 Claims, 9 Drawing Figures

BALER AND PROCESS FOR MAKING BALES OR FOR OPERATING THE BALER

FIELD OF THE INVENTION

Our present invention relates to a process and apparatus for making large rectangular bales, particularly rectangular bales of stalks and the like crop materials and fodders.

BACKGROUND OF THE INVENTION

In balers of the prior art, the crop material, such as stalks, stems and other cuttings from grass, cultivated plants, and the like, are fed into a pressing and a binding chamber from an intake or pickup mechanism by a feed mechanism.

Large-bale harvesters of this type are of increasing interest for farms because of their high area or coverage performance of several hectares per hour or more, whereby they can also be used when there are only brief periods of good weather. Most large-bale machines of this kind are round bale manufacturing devices, as is described in German patent application No. 27 40 399. The crop material is fed to the pressing chamber from an intake mechanism by press rollers positioned at the periphery of the pressing chamber to form a round bale, which is subsequently bound or tied up with cord.

The chief disadvantage of this kind of baler is the long idle time for the bale binding mechanism, which usually must operate for the same length of time as the mechanism for forming the bales so that the pickup is interrupted during binding.

A baler for rectangular bales has already been described in German patent document No. 32 08 645. The polygonal shape for the finished bale has the advantage that the bale is easier to transport and the space required in transport and storage is better utilized by about 20%. In these known balers the stalk crop is stuffed into the pressing chamber by a feed drum to produce a high density packing. After filling of the pressing chamber this device remains idle while the bale being made is bound or tied with cord and ejected.

The large-bale balers of the prior art have the inherent disadvantage, that a given idle time is necessary after filling the pressing chamber, during which the bales are bound and ejected. Furthermore they are relatively complicated and expensive.

OBJECTS OF THE INVENTION

It is the principal object of our present invention to provide a process for making bales and a baler, in which no idle time is required during the binding and the ejection of the bales, wherein also the baler travels over the field taking in cuttings continuously and continuously feeding them to the pressing chamber and thereafter to the binding chamber and, while a bale is being bound and pushed out, additional stalk crop can be taken up and processed.

It is a more general object of our invention to provide an improved baler,

It is also an object of our invention to provide an improved large-bale baler which is of a simpler structure and is thus more economical than those of the prior art.

It is a further object of our invention to provide an improved process for making bales of crop material from a stalk crop.

It is yet another object of our invention to provide a faster baler and process for making bales of stalk crop than those of the prior art, in which there is no idle time after filling the baler with crop material during which the cuttings are baled and bound into the finished bale and the finished bale is ejected from the baler, and in which the processes of baling and binding the compressed cuttings and the processes of intake and compression of new cuttings proceed simultaneously.

SUMMARY OF THE INVENTION

These objects and others which will become more apparent hereinafter are attained in accordance with our invention in a process for making a rectangular large bale of stalk crop comprising continuously picking up the crop material by an intake mechanism, guiding and feeding them from the intake mechanism into at least one chamber for binding and pressing by a feed mechanism, and binding or tying up the bale formed therein; and in a baler comprising an intake mechanism for the crop material, a feed mechanism for conveying the crop material from the intake mechanism into at least one chamber for binding and pressing, and a binding mechanism to bind the crop material or tie them with cord to form the finished bale.

According to the process of our invention the stalk crop material is fed continuously into the baler while the latter travels continuously over the field, and at predetermined time intervals a separator is operated to separate a bale from the continuous stand of compacted crop material. Thereafter the bale separator, on the one hand acting to retain the stalk material during compression and, on the other hand, able to slide forward in the feed direction of the bales, and also by continuous additional supply of the crop material, is pushed forward in the feed direction until a binding position for the cut away bale has been reached forming a gap between it and the continuous additional supply of cuttings.

After reaching the binding position, the process of binding the bale with cord is activated by a binding control mechanism.

After the process of binding is complete, the bale is pushed out of the baler by the next bale formed by the bale separator but before the new bale is tied.

In a preferred embodiment of our invention the bale separator splits a portion of the strand of compressed material forming bales from by plunging two separator units into the strand one from above the other from below, these separator units forming a pair of tongs and each comprising a plurality of pronglike first separating elements and pronglike second separating elements attached to each of the separator units.

The separator units are constructed and arranged so that a part of each separating unit can be slid forward in the feed direction of the strand while another part of each separator unit is fixed to form a gap between the bale and the remainder of the strand.

A cord is slung around three sides of the bale, this cord being supplied at the entrance of the chamber for pressing and binding and extending between a respective one of a plurality of rotatable tiers or knotters positioned above the chamber and a plurality of cord guide arms positioned below the chamber. The bale when completely bound is pushed out of the baler by the next bale being formed.

Advantageously an activating signal is provided to the operator of the tractor to indicate when the operator is to operate a bale separator operating valve connected to a baler operating hydraulic mechanism, so that the bale separator is operated. After completing the sliding of the advanceable bale separator part forward in the feed direction, the process of binding the bale is activated by the binding control mechanism. During the process of binding the binding control mechanism stops the process of binding before the rotatable tiers or knotters have completed a single revolution. After the process of binding, the operator of the tractor by operation of a bale separator operating valve returns the bale separator to the starting position, and opens it in order to be able to cut a subsequent bale away.

According to our invention the baler is provided with a bale separator for crop material continuously supplied to the baler positioned between the feed mechanism and the chamber for pressing and binding in the feed direction of the crop material mounted to the outside of the feed path of crop material, and by means of a hydraulic cylinder mechanism, the bale separator cuts away bales from the crop material.

Advantageously the bale separator comprises two pincer like separator units cooperating with each other and pivotable toward each other, each of the separator units having a row of fixed first separating elements and a row of second separating elements slidable in the feed direction of the crop material, wherein the second separating elements can be spaced a predetermined distance from the first separating elements by operation of at least one slider hydraulic cylinder connected thereto.

In another preferred embodiment of our baler each of the separator units is pivotally connected to the side walls of the housing of the baler by at least two pivot arms in such a way, that the bale separator is slidable forward in the feed direction of the crop material a predetermined distance with respect to the housing.

According to a further preferred embodiment of our invention each of the separator units has a first transverse beam running across the feed direction, to which a plurality of first cutting element supports extending in the feed direction and oriented parallel to each other are attached, to each of which at least one of the first separating elements oriented perpendicularly to the first transverse beam and the feed direction is attached.

Adjacent the first transverse beam an additional second transverse beam substantially parallel thereto is mounted slidably by means of at least one slider hydraulic cylinder in said feed direction, the second transverse beam having a plurality of second separating element supports attached thereto parallel to each other extending in the feed direction of the crop material, the second separating element supports being parallel to the first separating element supports, and each of the second separating element supports is provided with at least one second separating element extending perpendicularly to the feed direction and the second transverse beam.

This kind of baler has the advantage that it moves over the field continuously taking in crop materials, cultivated plants, or the like, eventually cutting them up farther and continuously feeding them to the chamber for binding and pressing.

After attaining a predetermined bale length according to our invention the bale separator cuts by plunging into the strand of the crop material and the slidable part of the bale separator feed forward a bale to be bound, which is pushed by the slidable second transverse beam with its associated second separating elements in the direction of the chamber for pressing and binding.

Between the fixed first separating elements and the second slidable separating elements a gap in the strand of crop materials is created in order to allow the passage of the cord guide arms of the binding mechanism.

The additional crop material taken up by the apparatus is held back by the fixed closed first separating elements of the bale separator, whereby the bale separator under pressure from the supplied crop material, because of the pivot arms with which it is attached to the housing of the baler together with the gap existing between the fixed and first and slid forward second separating elements, is shoved forward until the binding position is reached, in which the bale is bound. After retracting and opening the bale separator the stuffed in crop material is shoved forward in the direction of the chamber for binding and pressing, and push out the finished bale, whereafter a new bale is cut away and pushed forward.

According to a further preferred embodiment of our baler on each side of the second transverse beam of the upper one of the separator units a running roller is mounted, which, after closing of the bale separator and extending the second transverse beam relative to the first, running rollers engage under a guide rail mounted adjacent the edge of the housing of the baler in such a way that opening of the bale separator is prevented as long as the bale separator is positioned inside of the binding mechanism's radius of action, thereby preventing interference with the tying operation.

The first and and second separating elements are constructed as prongs with a rounded, bladelike or triangular cross section and are tapered to a point. Because of that a minimal operating force and a fast cutting away of a bale is guaranteed.

Advantageously the binding mechanism comprises at least one cord or binder-twine guide mounted below said chamber for pressing and binding and at least one rotatable tier mounted above said chamber for binding and pressing. Each of the cord guide arms is connected to a cord supply roller in the rotatable tier in such a way, that from each of the cord guide arms a cord runs to an associated one of the tiers, the cord being put around three sides of the bale on sliding of the bale in the feed direction thereto.

According to another further preferred embodiment of our invention the binding mechanism comprising said tiers and said cord guide arms is activated by a binding control mechanism, which allows the pivoting of each of the cord guide arms to each of the associated tiers, when the bale separator cuts away the bale, and extends a predetermined distance in the feed direction of the crop material.

Furthermore in another preferred embodiment of our invention the binding control mechanism has a contacting cam pivotally mounted on the exterior of the housing of the baler, on which at least one bale separator hydraulic cylinder of the bale separator hydraulic cylinder mechanism contacts and operates, so that a shift bar is thereby raised by the contacting cam, which disengages a pawl by operation of a side bar rigidity attached to the shift bar, thus releasing the tiers or binding mechanism.

The pawl returns before completion of one rotation of the tiers to the engaged configuration and the side bar engages thereunder. This ensures that after performing the binding operation, the cord guide arms immediately swing back into their original position, whereafter the bale separator is retracted and reopened.

A measuring wheel can be provided in the chamber for pressing and binding for the bale length, this measuring wheel cooperating with a shifting rod provided with a recess by means of a measuring wheel shaft of the measuring wheel in such a way that, when a predetermined bale length has been reached, the shifting rod operates an electrical switch by means of a measuring lever attached thereto. When the switch operates an electrical warning light can be lit and then the operator of the tractor can operate a bale separator hydraulic cylinder valve positioned on the tractor frame, whereby the bale separator is returned to its original position, so that it can receive fresh crop material and cut away the next bale.

At least one hydraulic cylinder for the bale separator and at least one slider cylinder for the movable part of the bale separator can comprise the hydraulic cylinder mechanism and are controllable by means of a hydraulic cylinder mechanism valve combinable with the hydraulic system of the tractor.

The chamber for binding and pressing has a press pad attached to both the interior top panel and the interior bottom panel of the chamber, the ends of the press pads opposite to the chamber being pivotally supported and are acted upon by press pad supports, which are subjected to a hydraulic operating force from a pressurized container to further compact the separated bale.

The feed mechanism can be provided with an auxiliary cutting mechanism which can cut the crop material into smaller pieces.

The baler according to our invention is less costly than the balers of the prior art. The performance of this baler is substantially increased, since the idle time during the bale binding is eliminated. By the intake mechanism and the feed mechanism the cuttings are fed under force in the direction of the chamber for pressing and binding, wherein after the cutting away of a bale from the supplied cuttings, they are held up by the fixed first separating elements of the closed bale separator, whereby a comparatively high compression results.

The process according to our invention succeeds for the first time in making rectangular bales continuously and, of course, from any kind of cuttings, with no matting inside the bale, so that it is easily released.

BRIEF DESCRIPTION OF THE DRAWING

The above and other objects, features, and advantages of our invention will become more readily apparent from the following description, reference being made to the accompanying highly diagrammatic drawing in which.

SPECIFIC DESCRIPTION

Figure 1:
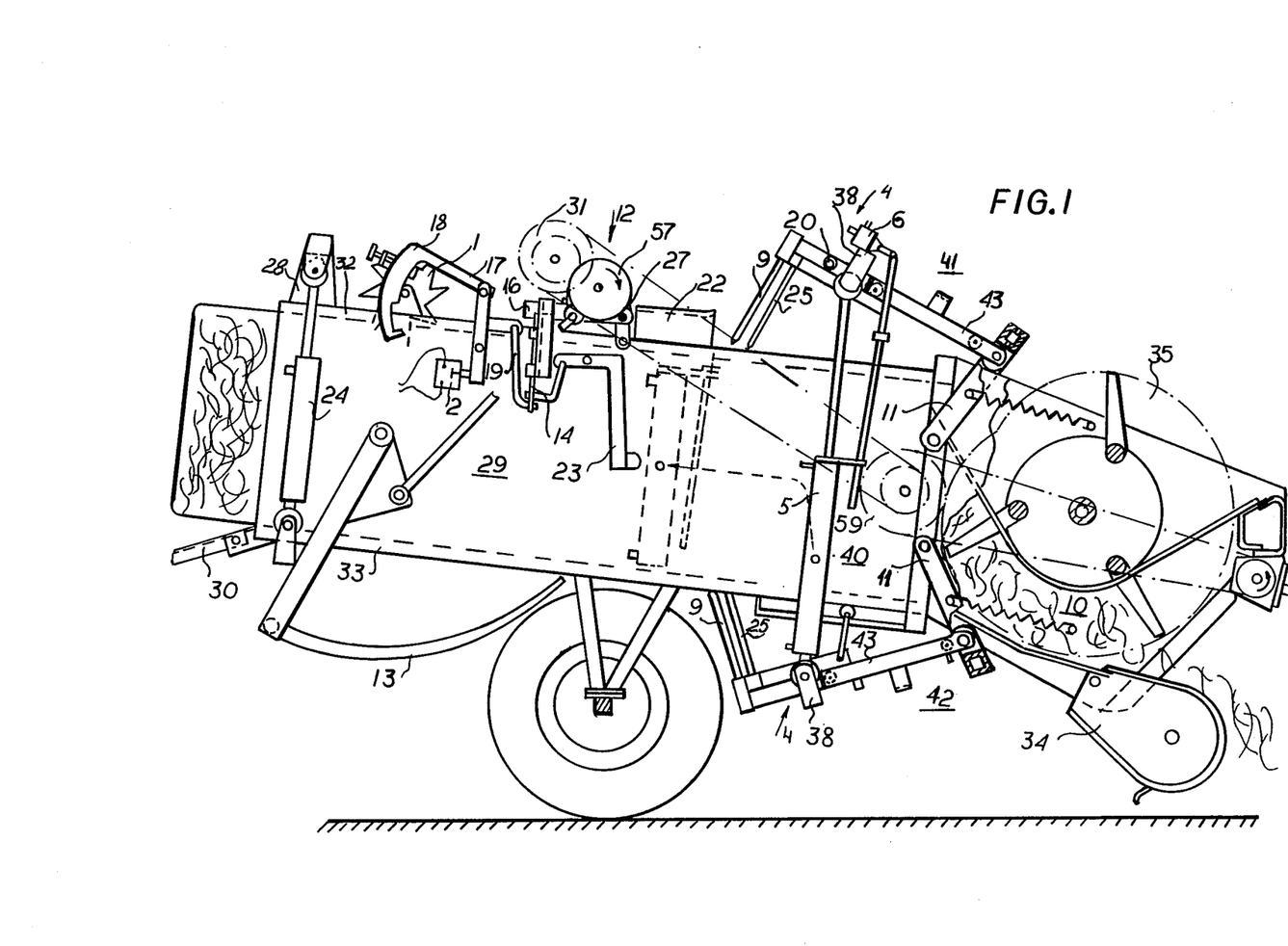
FIG. 1 is a schematic side view of a preferred embodiment of the baler according to our invention with a bale separator and a suitable control mechanism.

FIG. 1 shows a preferred embodiment of the baler according to our invention for continuous manufacture of bales of crop material from grass, cultivated plants or the like. This apparatus is attachable to a tractor (not shown), which can draw it over the field in the usual manner.

Moreover the flow of crop materials from the intake mechanism 34 is continuously guided by a feed mechanism 35, if necessary, combined with an auxiliary cutting mechanism 59 shown in dot-dash lines in FIG. 1.

This flow of crop material 10 reaches a rectangular chamber 29 for pressing and binding, in whose entrance a binding mechanism comprising a plurality of tiers 12 and cord guide arms 13 is provided.

According to this embodiment the baler is provided with a bale separator or crop-material strand cutter 4, which is positioned between the feed mechanism 35 and the chamber 29 mounted outside of the feed path, which takes the crop material.

The bale separator 4 is positioned with clearance from the feed mechanism 35 at a position, at which supplied crop materials are bunched together in a tightly compressed bundle or stand with a uniform cross section.

The bale separator 4 comprises an upper separator unit 41 and a lower separator unit 42, which cooperate together like teeth, in order to cut a bale from the strand of crop material.

Each separator unit 41 and 42 has a first transverse beam 36 which extends across the feed direction of the crop material, whereby a plurality of first separating element supports 37 are provided parallel to each other extending in the feed direction of the crop material, to each of which at least one first separating element 25 is attached extending perpendicularly to the first transverse beam 36 and to the feed direction of the flow of crop material 10.

Adjacent each first transverse beam 36 in each separator unit 41 and 42 an additional second transverse beam 38 is mounted slidably relative to the first transverse beam 36 in the feed direction of the crop material, which likewise has a plurality of second separating element 9. Each second separating elements support 39 is provided with at least one second separating element 9 perpendicular to the second transverse beam 38 and to the feed direction of the flow of crop material.

Both separator units 41 and 42 are connected together by a bale separator hydraulic cylinder 5, which is controllable by a main hydraulic valve 3 on the tractor (see FIG. 6), which can cause it to extend or contract. The longitudinal guide bars 43 for the first transverse beam 36 and the second transverse beam 38 are pivotally attached exteriorly to both side walls of the housing 40 of the baler on pivot arms 11, so that the entire bale separator 4 can be pushed a preset distance in the feed direction.

Figure 2:
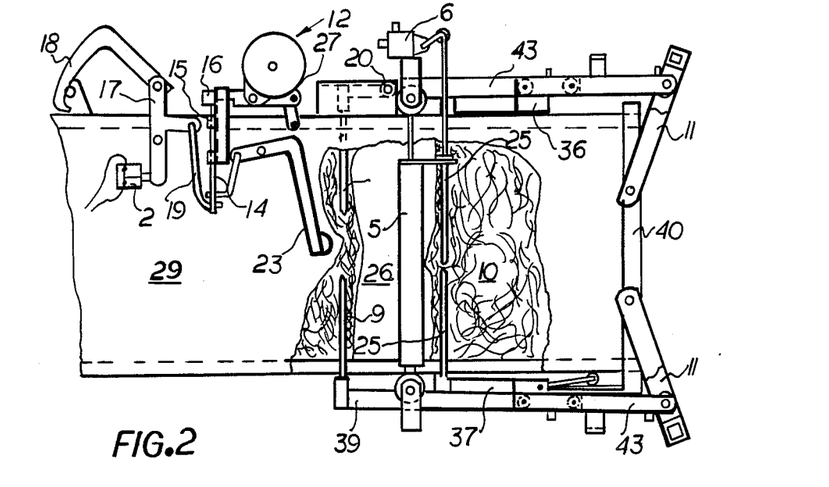
FIG. 2 is a schematic side view of a part of the baler according to FIG. 1 showing the bale separator closed and a gap between the crop material flowing in and the bale which has been cut away from them.
Figure 7:
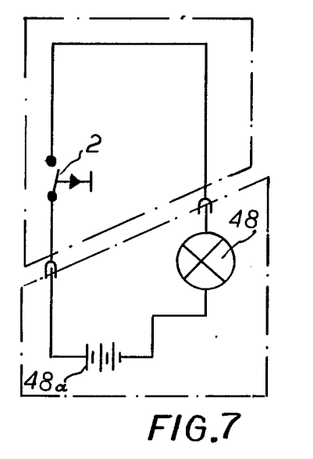
FIG. 7 is a schematic circuit diagram of an optical indicator used in conjunction with the hydraulic cylinder mechanism of our invention.

In FIGS. 1 and 2 a binding control mechanism is shown, which after an adjustable bale length has been reached activates the bale binding mechanism. This binding control mechanism comprises a measuring wheel 1 for the bale length, whose measuring wheel shaft cooperates with a shifting rod 18, in which a recess is present in a suitable position. The shifting rod 18 is rigidly attached angularly to a measuring lever 17, which is pivotally mounted on a side wall of the housing 40. When the shifting rod 18 is fully raised the measuring lever 17 is fully pivoted, which sends an indicating signal into the cabin of the tractor via switch 2 (FIGS. 1, 2 and 7). The operator can now activate the main hydraulic valve 3 shown in FIG. 6, to close the bale separator 4 and cut away the bale.

FIG. 1 shows that configuration of the baler at the beginning of the crop material inflow, in which the bale separator 4 is retracted out of engagement. Tiers 12 comprise at least one suitable cord supply roller 57 (tiers 12 are oriented parallel to each other when more than one roller is employed) which supply cord 27, and cord guide arms 13 are driven pivotally by a tying mechanism from the bottom of the chamber 29 to its top. Crop material supplied into the chamber 29 contact the individual cords 27 on three sides as they are forced into chamber 29 further, whereby the resistance the cords 27 have to being unwound is overcome, in order to partially surround and bind the incipient bale as it advances. After a suitable quantity of crop material is introduced into the baler, and the bale length has been measured, the operator activates the bale separator 4, in order to cut away a bale from the strand. By forcing into the hydraulic cylinder 5 hydraulic fluid from the hydraulic reservoir or system of the tractor, the separator units 41 and 42 are moved toward each other, whereby the first and second separating elements 25 and 9 dig into the strand from above and below.

After the bale separator 4 is closed, a slider cylinder valve 6 is operated by contact of one of the separator units 41 and 42, whereby the slider cylinder 7 is activated, so that in each separator unit 41 and 42, the second transverse beam 38 is slid with its associated second separating element supports 39 for second separating elements 9 in the feed direction of the crop material.

Figure 3:
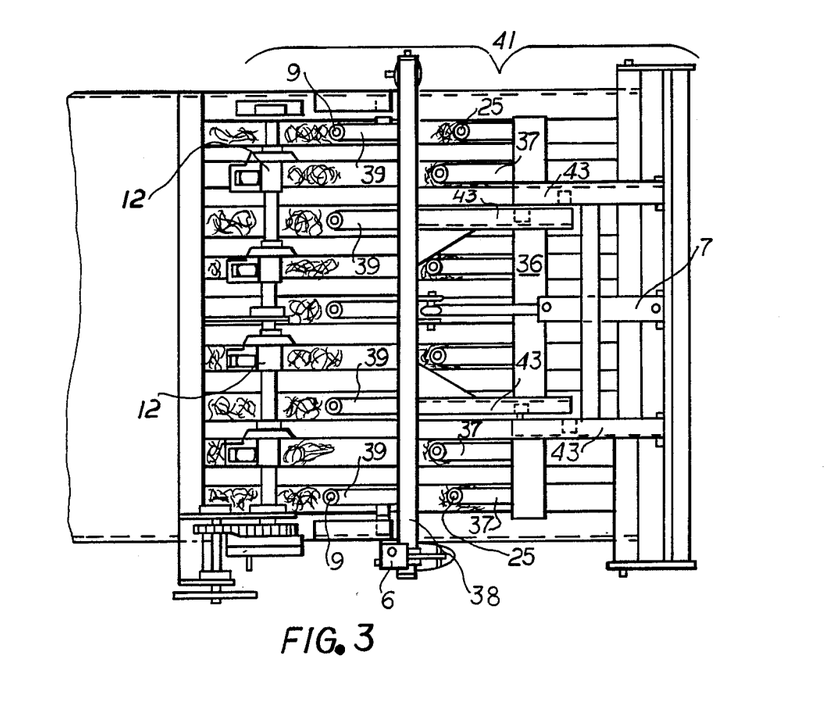
FIG. 3 is a schematic top view of the baler according to FIG. 1 in the configuration shown in FIG. 2.

FIG. 2 shows a side view of this configuration of the baler, wherein it is apparent, that between the unshifted first separating elements 25 and the shifted second separating elements 9 a gap 26 arises as the bale is pushed in the chamber 29 and the cords 27 contact the bale on three sides. FIG. 3 shows a top view of this configuration.

As the apparatus continuously takes in the cuttings and presses them on the first separating elements 25, the entire bale separator or cutter 4, because of its pivotal linkage by the pivot arms 11 is pushed forward in the direction of the chamber 29 and therefore into the binding position.

Figure 4:
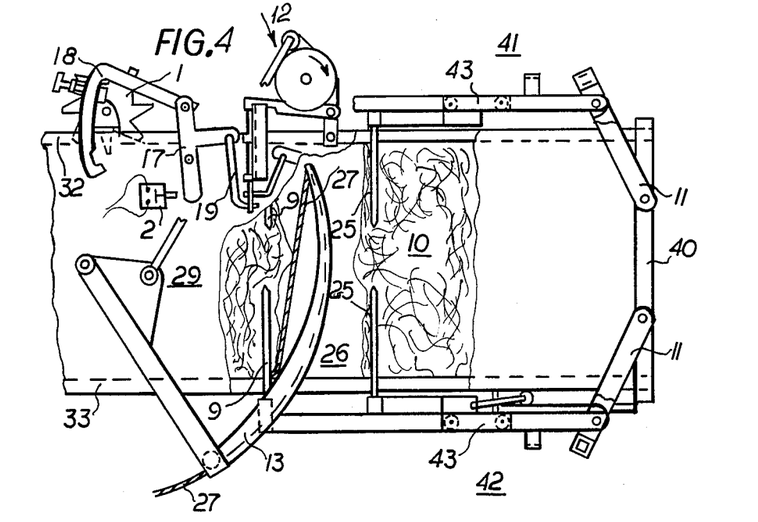
FIG. 4 is a schematic side view of the baler according to FIG. 1 in the binding configuration.
Figure 5:
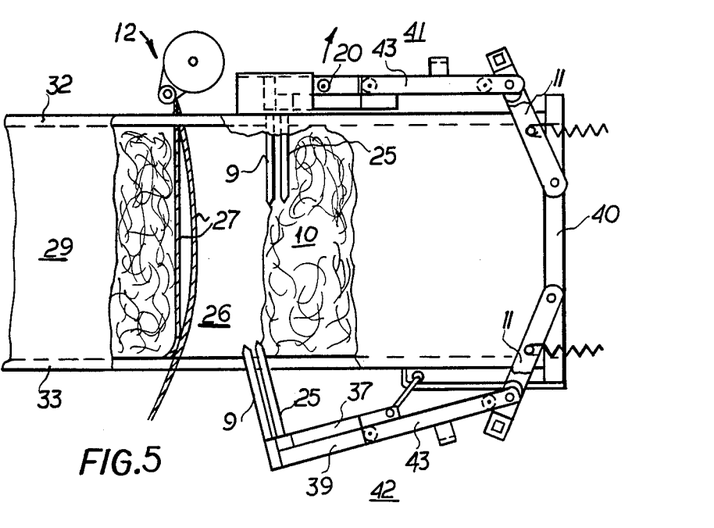
FIG. 5 is a schematic side view of the baler according to FIG. 1 in the baling configuration during the opening of the bale seprator.

As can be learned from FIG. 4, in this advanced position by swinging up the individual cord guide arms 13 into the gap 26, and making a knot with the tiers 12, the bale is completely bound. After swinging back of the cord guide arms 13 into their original position, the bale separator or cutter 4 must next return to its original position, since it could damage the tiers 12 in swinging up. So as to avoid an upward swing of the bale separator 4 in the forward position a running roller 20 is provided on each side of the traveling second transverse beam of the upper separator unit 41, which engages under a guide rail 22 provided on the side walls of the housing 40, so that opening of the bale separator 4 is prevented as long as it is positioned between the tiers 12 and the cord guide arms 13 in the radius of action of the binding mechanism.

After the bale separator 4 returns far enough for operation of the bale separator hydraulic cylinder 5 to open the bale separator 4, that is, so that both separator units 41 and 42 can move away from each other, so that the renewed flow of crop material held up by the first separating elements 25 is fed in the direction of the baling chamber 29, and since the bale measuring device has been reset, the predetermined bale length can be reached. The activation of the tying process in the configuration of the baler shown in FIG. 4 occurs by a control mechanism, as is shown in FIG. 1. At the extreme position of the sliding motion of the bale separator 4 the bale separator hydraulic cylinder 5 contacts and operates a contacting cam 23 pivotally mounted on the exterior of a side wall of the housing 40. The contacting cam 23 is rigidly connected with a shift bar 14, which during operation of the contacting cam 23 is raised by contact with the bale separator hydraulic cylinder 5, and this disengages a pawl 16 to which it is attached by side bar 15 from its arresting position. The pawl 16 is directly connected with the tier 12 and it releases the tiers of the tying mechanism.

Before the tier 12 has performed a complete revolution, the pawl 16 again locks into the locked or arresting configuration and the side bar 15 engages under it. Since the control mechanism is connected with the bale measuring device by a lever 19, this takes its neutral position and the pawl 16 is again returned to its original position.

Figure 6:
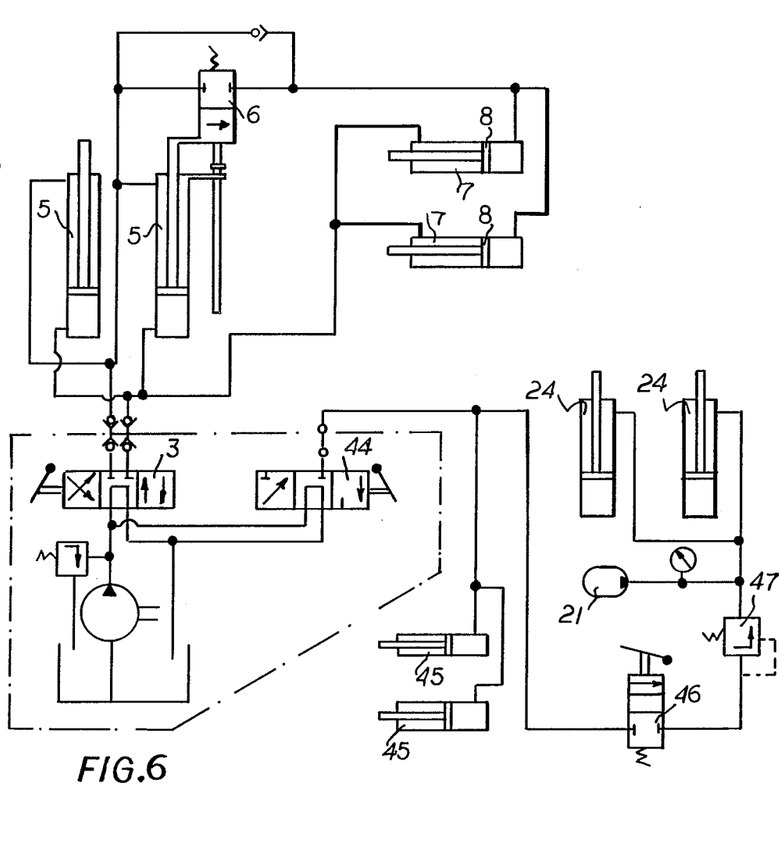
FIG. 6 is a plan view of the hydraulic lines and connections required for control of the various hydraulic cylinders of the baler according to our invention.

A further compression of the bale bed to the chamber 29 for pressing and binding can be obtained by the movable longitudinal press pads 32 and 33 mounted on the top and bottom panels of this rectangular chamber 29, which are pivotally mounted at their ends adjacent to the binding mechanism 12 and 13. The longitudinal press pads 32 and 33 are mounted with press rails by press pad supports 28, and are acted upon by a hydraulic press cylinder 24, which can be constructed to provide a predetermined maximum pressure. The hydraulic press cylinder 24 can be acted upon with pressure, for example from a pressurized gas reservoir or accumulator 21 (FIG. 6). In order to guarantee a troublefree sliding away of the already bound bale by the next bale being fed into the baling chamber, one or more ejection rails 30 are provided.

The operation of the baler according to our invention is as follows: After the measuring wheel 1 has measured the corresponding bale length, a signal, for example an optical signal (FIG. 7), is given to the operator. The operator activates the main hydraulic valve 3 (FIG. 6), whereby the bale separator 4 is acted on by the bale separator hydraulic cylinders 5, so that the separating elements 25 and 9 plunge into the flow of crop material 10. After that the slider cylinder valve 6 (FIG. 6) is opened, whereby the slider cylinders 7 extend, the piston surfaces 8 being acted upon. After cutting of the crop material 10 the second separating elements 9 are spaced from the first separating elements 25 and slide the cut bale forward, so that a gap 26 arises. By the presistent, continuous intake of the crop material the entire bale separator 4 is shoved forward in the direction of the chamber 29, until the gap 26 reaches the tying position. The initiation of the tying process occurs by engagement with cylinder 5, which operates the contacting cam 23 at the extreme end of the travel of the bale separator 4. By lifting out the pawl 16 from its arresting position the tying process is released, in which the cord guide arms 13 are pivoted through the existing gap 26 in the direction of the tiers 12.

After locking the pawl 16 to the front end of the periphery of the tier 12 in its initial position and engaging the side bar 15 under it, the bale length measuring device is put back in its null position by the lever 19. When the null position of the bale length measuring device is attained a signal, for example an optical signal (see FIG. 7), is generated in the operator's cabin, which tells the operator that the tying is completed.

The operator now activates anew the main hydraulic valve 3, whereby the hydraulic cylinders 5 and 7 act in the opposite directions, so that the bale separator 4 is drawn back into its original position. By that the cuttings jammed up in the bale separator are fed in the feed direction into the chamber 29, so that the bound bale is taken off, for example by the output rails 30. The apparatus is then ready for a new baling process.

In the schematic diagram of the hydraulic lines and cylinders comprising the hydraulic control mechanism of the baler shown in FIG. 6, a hydraulic cylinder 45 for the intake mechanism 34, a control valve 46 for the press rails 28, and a limiting valve 47 for the oil pressure are also shown. FIG. 7 shows a schematic circuit diagram for the optical indicator 48 which is operated by the switch 2. The switch 2 is in series with a battery 48a and the optical indicator for this purpose.

Figures 8A, 8B:
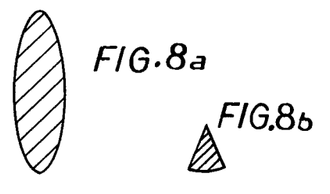
FIGS. 8a and 8b are cross sectional views of two preferred shapes of the separating elements of our invention.

In FIG. 8a the cross section of the first and second separating elements 9 and 25 is shown to be knifelike but rounded. In a different embodiment in FIG. 8b that cross section is shown to be three concerned, but rounded.

We claim:

1. In a process for making rectangular bales from crop material from grass, cultivated plants and the like in a baler wherein said crop material is fed into a chamber for pressing and binding by a feed mechanism from an intake mechanism, said bales being bound by cord in said chamber, the improvement wherein said crop material from grass, cultivated plants, and the like is fed continuously in a strand into said baler, and in a predetermined time interval a bale separator is operated to cut away one of said bales from said strand, thereafter said bale separator acting to retain said crop material and simultaneously sliding forward in the feed direction of said bale, said bale separator by continuous additional supply of said crop material also being pushed forward in said feed direction until a binding position for said cut away one of said bales has been reached forming a gap between said cut away one of said bales and said continuous additional supply of said crop material, and after reaching said binding position the process of binding said cut away one of said bales with cord is activated by a binding control mechanism, and after said process of binding is complete said cut away one of said bales which has been bound is pushed out of said binding position by the next one of said bales formed by said bale separator of the bales being separated from the strand of said crop material fed into said baler by plunging into said crop material two separator units from above and below each comprising a plurality of pronglike first separating elements and pronglike second separating elements attached to each of said separator units, wherein said separator units are structured so that a part of said separator units can be slid forward in said feed direction with respect to said crop material and another fixed part of said separator units, whereby cord is put around three sides of said cut away one of said bales, said cord being at the entrance of said binding chamber extending between a plurality of rotatable tiers positioned above said binding chamber and cord guide arms positioned below said binding chamber, and pushing said bale, when completely formed, out of said baler by said next one of said bales being formed.

2. The improvement according to claim 1 wherein said process additionally comprises providing an activating baler signal to an operator of a tractor drawing said bales to indicate when said operator is to operate a bale separator operating valve connected to a baler operating hydraulic mechanism, so that said bale separator is operated, and, after completing the sliding of said bale separator forward in said feed direction, said process of binding said bale being activated by said binding control mechanism, and during said process of binding said binding control mechanism stops said process of binding before said rotatable tiers have completed a single revolution and after said process of binding, said operator of said tractor by operation of said bale separator operating valve returns said bale separator to the starting position, and opens said bale separator in order to cut a subsequent bale away.

3. In a baler for making rectangular bales from crop material from grass, cultivated plants and the like comprising an intake mechanism for said crop material, a feed mechanism for supply of said crop material from said intake mechanism into a chamber for pressing and binding, and a binding mechanism to bind said crop material into said bales, the improvement wherein a bale separator for said crop material continuously supplied to said baler is provided between said feed mechanism and said chamber in the feed direction of said crop material mounted to the outside of the feed path of said crop material and by means of a hydraulic cylinder mechanism said bale separator cuts away bales from said crop material, said bale separator comprising two pincerlike separator units cooperating with each other and pivotable toward each other, each one of said separator units having a row of fixed first separating elements and a row of second separating elements slidable in said feed direction of said crop material, wherein said second separating elements can be spaced a predetermined distance from said first separating elements by operation of at least one slider hydraulic cylinder connected thereto to effect separation of a bale from a strand of the crop material continuously fed to said chamber.

4. The improvement according to claim 3 wherein each of said separator units is pivotally connected to the side walls of a housing of said baler by at least two pivot arms in such a way that said bale separator is slidable forward in said feed direction of said crop material a predetermined distance with respect to said housing.

5. The improvement according to claim 4 wherein each of said separator units has a first transverse beam running across said feed direction, first separating element supports extending from each respective first transverse beam in said feed direction and oriented parallel to each other and are attached thereto, each separating element support having at least one of said first separating elements oriented perpendicularly to said first transverse beam and said feed direction and attached thereto, and adjacent said first transverse beam an additional second transverse beam substantially parallel thereto and slidably mounted by means of at least one slider hydraulic cylinder in said feed direction, said second transverse beam having second separating element supports attached thereto parallel to each other extending in said feed direction of said drop material, said second separating element supports also running parallel to said first separating element supports, and each of said second separating element supports is provided with at least one of said second separating elements extending perpendicularly to said feed direction and said second transverse beam.

6. The improvement according to claim 5 wherein on each side of said second transverse beam of the upper one of said separator units a running roller is mounted whereby after closing of said bale separator and extending said second transverse beam, said running rollers engage under a guide rail mounted adjacent the edge of said housing of said baler in such a way that opening of said bale separator is prevented as long as said bale separator is positioned to be intercepted by said binding mechanism.

7. The improvement according to claim 5 wherein said first and second separating elements are constructed as prongs with a rounded knifelike cross section and are tapered to a point.

8. The improvement according to claim 5 wherein said first and second separating elements are constructed as prongs with a rounded, three cornered cross section and are tapered to a point.

9. The improvement according to claim 6 wherein said binding mechanism comprises at least one cord guide arm mounted below said chamber for pressing and binding and at least one rotatable tier mounted above said chamber, and each of said cord guide arms is connected to a cord supply roller of said rotatable tier in such a way that from each of said cord guide arms a cord runs to an associated one of said tiers, said cord being put around three sides of said bale on sliding of said bale in said feed direction relative thereto.

10. The improvement according to claim 9 wherein said binding mechanism comprising said tiers and said cord guide arms is activated by a binding control mechanism which allows the pivoting of each of said cord guide arms to each of said associated tiers when said bale separator cuts away said bale and extends a predetermined distance in said feed direction of said crop material.

11. The improvement according to claim 10 wherein said binding control mechanism has a contacting cam pivotally mounted on the exterior of said housing of said baler, which at least one bale separator hydraulic cylinder of said bale separator mechanism contacts and operates, so that a shift bar is thereby raised by said contacting cam which disengages a pawl from said tiers by operation of a side bar rigidly attached to said shift bar.

12. The improvement according to claim 11 wherein said pawl engages said tiers before completion of one rotation thereof and said side bar engages under said pawl.

13. The improvement according to claim 3 wherein a measuring wheel is provided in said chamber for engagement with a bale for determining the length thereof, said measuring wheel cooperating with a shifting rod provided with a recess by means of a measuring wheel shaft of said measuring wheel engaging said shifting rod in such a way that when a predetermined bale length is reached, said shifting rod operates an electrical switch by means of a measuring lever attached thereto.

14. The improvement according to claim 3 wherein at least one hydraulic cylinder for said bale separator and at least one slider cylinder for said bale separator comprises said hydraulic cylinder mechanism and are controllable by means of a main hydraulic cylinder valve combinable with a hydraulic system of a tractor lowing said baler.

15. The improvement according to claim 3 wherein said feed mechanism is provided with an auxiliary cutting mechanism, which cuts said crop material into smaller pieces.

16. A method of operating a baler, comprising the steps of:
(a) continuously displacing said baler over a field;
(b) continuously picking up crop material from said field during the displacement of said baler thereover;
(c) continuously compacting the picked up crop material into a strand of rectangular cross section;
(d) intermittently introducing a pair of arrays of separator prongs into said strand from opposite sides thereof;
(e) temporarily restraining an upstream portion of said strand with some of said prongs while displacing a downstream portion of said strand with others of said prongs to shift a bale of crop material away from the remainder of said strand;
(f) slinging a cord around said bale as it is displaced away from the remainder of said strand and bringing said cord between said bale and said remainder of said strand to tie said bale; and
(g) retracting said prongs from said strand to permit advance of said remainder of said strand to eject said bale and repeating steps (d) to (g).

* * * * *